(12) United States Patent
Sobel (10) Patent No.: US 9,059,870 B1
(45) Date of Patent: Jun. 16, 2015

(54) TECHNIQUES FOR MANAGING ELECTRONIC MESSAGE DISTRIBUTION (71) Applicant: Symantec Corporation, Mountain View, CA (US)

(72) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 285 days.

(21) Appl. No.: 13/646,337

(22) Filed: Oct. 5, 2012

(51) Int. Cl.
*G06F 15/16* (2006.01)
*H04L 12/58* (2006.01)

(52) U.S. Cl.
CPC .............. *H04L 12/58* (2013.01); *H04L 12/5855* (2013.01)

(58) Field of Classification Search
CPC ..... H04W 12/02; H04L 12/58; H04L 12/585; H04L 12/5855; H04L 12/5865; G06Q 10/107
USPC .......................... 709/200–206, 217–227, 228
See application file for complete search history.

(56) References Cited

U.S. PATENT DOCUMENTS

| | | | | |
|---|---|---|---|---|
| 6,363,414 B1 * | 3/2002 | Nicholls et al. | ............... | 709/206 |
| 7,054,905 B1 * | 5/2006 | Hanna et al. | ................. | 709/206 |
| 7,072,947 B1 * | 7/2006 | Knox et al. | ................... | 709/217 |
| 7,076,533 B1 * | 7/2006 | Knox et al. | ................... | 709/217 |
| 7,111,068 B2 * | 9/2006 | Akimoto et al. | .............. | 709/230 |
| 7,506,155 B1 * | 3/2009 | Stewart et al. | ................ | 713/152 |
| 8,015,250 B2 * | 9/2011 | Kay | .............................. | 709/206 |
| 8,032,750 B2 * | 10/2011 | Swedor et al. | ............... | 713/170 |
| 8,156,187 B2 * | 4/2012 | Hardy et al. | .................. | 709/206 |
| 8,176,205 B2 * | 5/2012 | Sze et al. | ...................... | 709/246 |
| 8,190,878 B2 * | 5/2012 | Stern et al. | ..................... | 713/153 |
| 2006/0259761 A1 * | 11/2006 | Butenko | ....................... | 713/153 |
| 2009/0113012 A1 * | 4/2009 | Singer | .......................... | 709/206 |
| 2012/0030187 A1 * | 2/2012 | Marano et al. | ................ | 707/709 |

OTHER PUBLICATIONS

"LetMobile. Securing Corporate email on Personal Mobile Devices," Brochure, 7 pages, 2012 LetMobile Ltd., downloaded fromhttp://letmobile.com/sites/default/files/LetMobile_Secure_Mobile_Email_White_Paper_120904.pdf.

* cited by examiner

*Primary Examiner* — Moustafa M Meky
(74) *Attorney, Agent, or Firm* — Wilmer Cutler Pickering Hale and Dorr LLP (57) ABSTRACT

Techniques for managing electronic message distribution are disclosed. In one particular embodiment, the techniques may be realized as a method for managing electronic message distribution, the method includes analyzing an electronic message, determining whether the electronic message satisfies one of a plurality of predetermined conditions, converting at least a portion of the electronic message from a first format to a second format based on the determination of whether the electronic message satisfies the one of the plurality of predetermined conditions, and transmitting the converted electronic message.

19 Claims, 5 Drawing Sheets

TECHNIQUES FOR MANAGING ELECTRONIC MESSAGE DISTRIBUTION

FIELD OF THE DISCLOSURE

The present disclosure relates generally to electronic messaging and, more particularly, to techniques for managing electronic message distribution.

BACKGROUND OF THE DISCLOSURE

Protection of email content distributed from an email server to a mobile device is important when the content of the email includes sensitive information. Conventional mobile email distribution tools may convert all emails distributed to the mobile device into an HTML markup such that when the email is viewed or read, a webpage is loaded from a server instead of downloading and locally storing the email message on the mobile device. However, conversion of all emails to an HTML markup limits the usability of the mobile device. For example, a user of the mobile device may not be able to access or read any emails on the mobile device when there is no available network connection or connection to the email server. In view of the foregoing, it may be understood that there may be significant problems and shortcomings associated with current electronic message distribution management technologies.

SUMMARY OF THE DISCLOSURE

Techniques for managing electronic message distribution are disclosed. In one particular embodiment, the techniques may be realized as a method for managing electronic message distribution, the method comprising: analyzing an electronic message; determining whether the electronic message satisfies one of a plurality of predetermined conditions; converting at least a portion of the electronic message from a first format to a second format based on the determination of whether the electronic message satisfies the one of the plurality of predetermined conditions; and transmitting the converted electronic message.

In accordance with other aspects of this particular embodiment, the plurality of predetermined conditions are set by a user.

In accordance with further aspects of this particular embodiment, analyzing the electronic message includes determining whether a header of the electronic message satisfies a first predetermined condition, the first predetermined condition including at least one of a first plurality of predetermined keywords, a known recipient, and a known sender.

In accordance with additional aspects of this particular embodiment, analyzing the electronic message includes determining whether a body of the electronic message satisfies a second predetermined condition.

In accordance with further aspects of this particular embodiment, the second predetermined condition includes a second plurality of predetermined keywords.

In accordance with further aspects of this particular embodiment, analyzing the electronic message includes determining whether the electronic message includes an attachment.

In accordance with further aspects of this particular embodiment, when the electronic message is determined to include the attachment, the attachment is analyzed to determine whether it satisfies a third predetermined condition.

In accordance with additional aspects of this particular embodiment, the first format is a message format locally cacheable on a mobile client and the second format is a message format that is not locally cacheable on the mobile client.

In accordance with further aspects of this particular embodiment, the second format is a non-cacheable webmail format according to the HyperText Markup Language (HTML) standard.

In accordance with further aspects of this particular embodiment, the method further comprises: intercepting the electronic message; receiving a request to retrieve electronic messages; and determining whether the electronic message has yet to be transmitted, in response to the reception of the request such that the analyzing the electronic message is performed when it is determined that the electronic message has not yet been transmitted.

In accordance with additional aspects of this particular embodiment, the electronic message is an email message, the converted electronic message is transmitted from an electronic messaging server to a mobile client, and determining whether the electronic message satisfies one of the plurality of predetermined conditions is performed at a server separate from the electronic messaging server.

In accordance with further aspects of this particular embodiment, the method further comprises: determining a location of the mobile client such that converting at least the portion of the electronic message from the first format to the second format is based on the determined location of the client.

In accordance with additional aspects of this particular embodiment, the location of the mobile client is transmitted from the mobile client to the server.

In accordance with additional aspects of this particular embodiment, a body of the electronic message is converted from the first format to the second format when the location of the client is determined to be unknown.

In accordance with additional aspects of this particular embodiment, a body of the electronic message is converted from the first format to the second format when the location of the client is determined to be outside of a predetermined area.

In accordance with additional aspects of this particular embodiment, an attachment to the electronic message is converted from the first format to the second format based on the determined location of the client.

In accordance with further aspects of this particular embodiment, a plurality of electronic messages are converted from the first format to the second format based on the determined location of the client.

In accordance with further aspects of this particular embodiment, the method further comprises: classifying the electronic message based on the analysis of the electronic message and the determination of whether the electronic message satisfies the one of the plurality of predetermined conditions; determining a security policy based on the classification of the electronic message; and applying the security policy to the electronic message such that the security policy indicates when electronic message is to be converted from the first format to the second format.

In another particular embodiment, the techniques may be realized as at least one nontransitory processor readable storage medium storing a computer program of instructions configured to be readable by at least one processor for instructing the at least one processor to execute a computer process for performing a method for managing electronic message distribution, the method comprising: analyzing an electronic message; determining whether the electronic message satisfies one of a plurality of predetermined conditions; converting at least a portion of the electronic message from a first format to a second format based on the determination of whether the electronic message satisfies the one of the plurality of predetermined conditions; and transmitting the converted electronic message.

In another particular embodiment, the techniques may be realized as a system for managing electronic message distribution comprising: one or more processors communicatively coupled to a network; wherein the one or more processors are configured to: analyze an electronic message; determine whether the electronic message satisfies one of a plurality of predetermined conditions; convert at least a portion of the electronic message from a first format to a second format based on the determination of whether the electronic message satisfies the one of the plurality of predetermined conditions; and transmit the converted electronic message.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
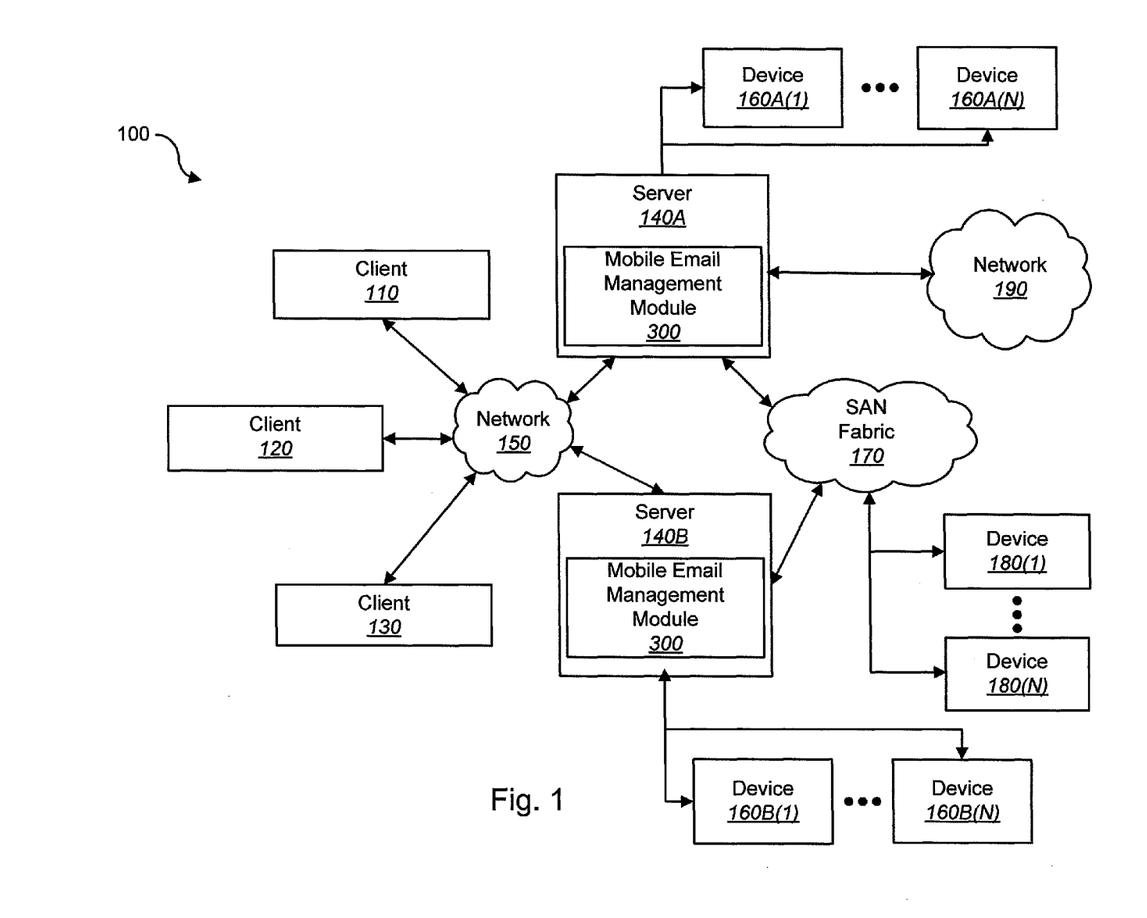
FIG. 1 shows a block diagram depicting a network architecture in accordance with an embodiment of the present disclosure.

FIG. 1 shows a block diagram depicting a network architecture 100 for electronic message distribution management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., electronic message management module 300 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
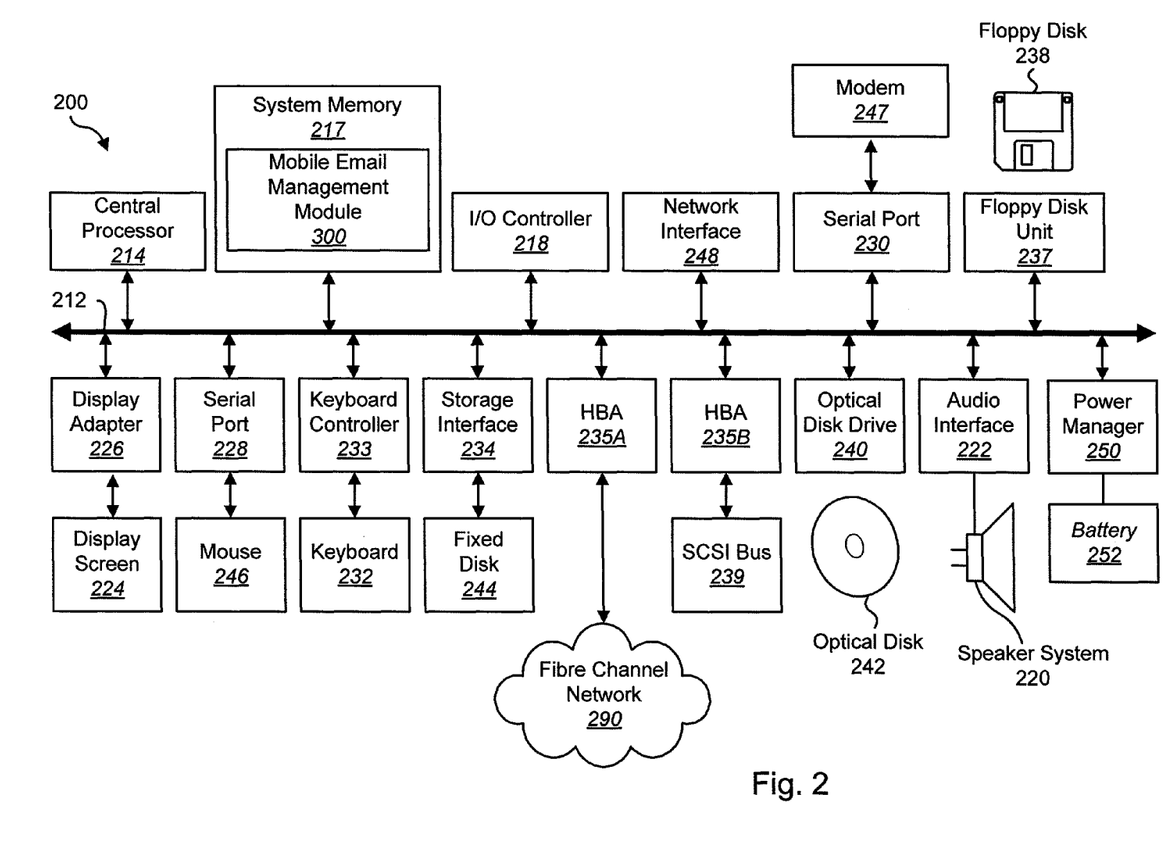
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, laptop computers, servers, other computers or computing devices, or other devices coupled via a wireless or wired connection to network 150. In some embodiments, the network 150 may be based on CDMA, GSM, OFDM, or any other appropriate network configuration. Clients 110, 120, and 130 may receive data from user input, a database, a file, a web service, and/or an application programming interface. In some embodiments, clients 110, 120, and 130 may transmit and receive email messages from and to an email server such that email messages may be locally cached and viewable when the client does not have a connection with the email server. Further, the clients 110, 120, and 130 may include functionality to access the internet and render webpages based on the HyperText Markup Language (HTML) standard or any other appropriate standard.

Servers 140A and 140B may be application servers, archival platforms, backup servers, network storage devices, media servers, email servers, document management platforms, enterprise search servers, or other devices communicatively coupled to network 150. In some embodiments, server 140A may be a Microsoft Exchange Server supporting Microsoft Exchange ActiveSync for distribution of email to message clients (e.g., mobile devices) such as clients 110, 120, and 130. Further, in some embodiments, the server 140B may be an ActiveSync proxy that sends and receives data from the clients 110, 120, and 130 to the server 140A, functioning as an email server. In other embodiments, the any one of the servers 140A and 140B may include functionality to analyze, categorize, and classify email messages according to predefined rules or classifications and apply certain security policies to the messages. For example, any one of the servers 140A and 140B may include the functionality of Data Loss Prevention (DLP) from Symantec Corp. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, servers 140A and 140B may contain one or more portions of software for electronic message distribution management such as, for example, electronic message management module 300, and electronic messages may be transmitted between the servers 140A and 140B. Further, one or more portions of the electronic message management module 300 may reside at a network centric location. For example, server 140A may be a server, a firewall, a gateway, or other network element that may perform one or more actions to support electronic message distribution management. According to some embodiments, network 190 may be an external network (e.g., the Internet) and server 140A may be a gateway or firewall between one or more internal components and clients and the external network. According to some embodiments, electronic message management module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. For example, electronic message management module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

The description below describes network elements, computers, and/or components of a system and method for method for managing electronic message distribution that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 3:
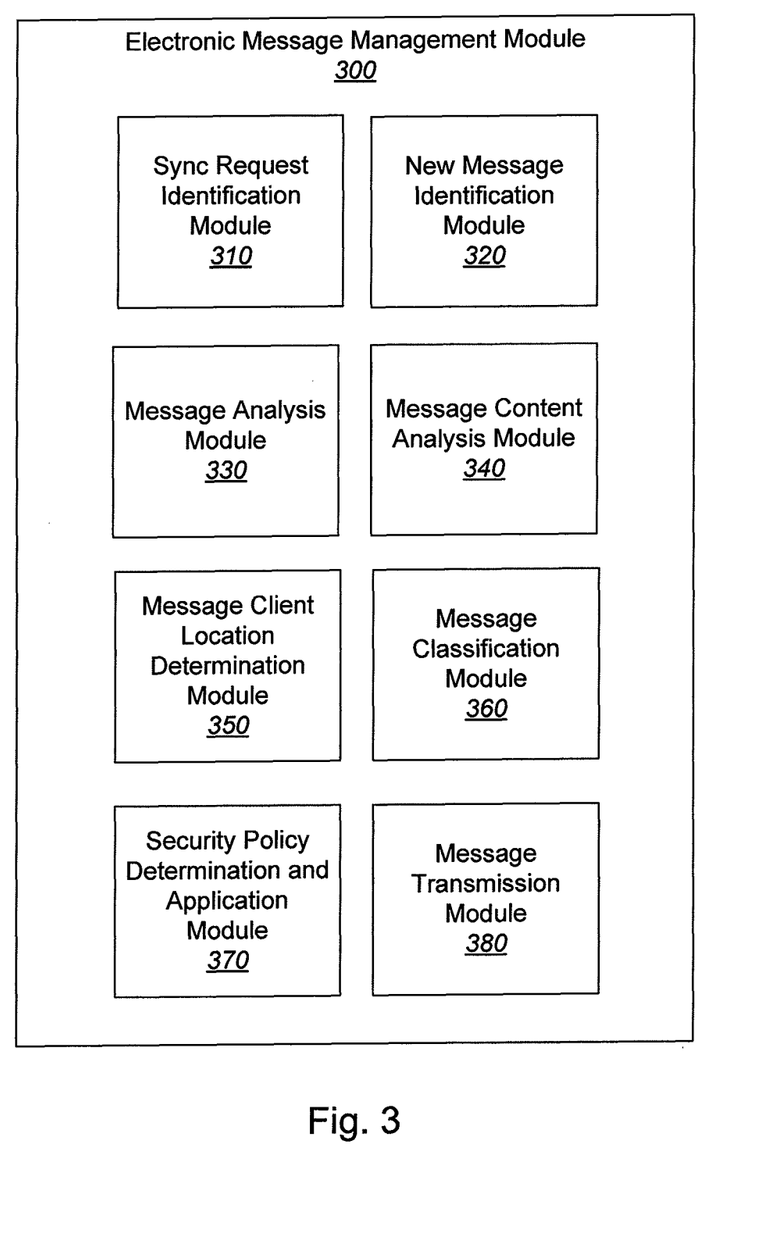
FIG. 3 shows a block diagram depicting an electronic message management module in accordance with an embodiment of the present disclosure.

FIG. 3 shows a electronic message management module 300 in accordance with an embodiment of the present disclosure. As illustrated, the electronic message management module 300 may contain one or more components including a sync request identification module 310, a new message identification module 320, a message analysis module 330, a message content analysis module 340, a message client location determination module 350, a message classification module 360, a security policy determination and application module 370, and a message transmission module 380.

In some embodiments, varying portions of the electronic message management module 300 may be arranged at the server 140A and the server 140B. In addition, the message analysis module 330, the message content analysis module 340, the message client location determination module 350, the message classification module 360, and the security policy determination and application module 370 may be arranged at a location separate from the sync request identification module 310, the new message identification module 320, and the message transmission module 380. For example, the sync request identification module 310, the new message identification module 320, and the message transmission module 380 may be arranged at an email sever while the message analysis module 330, the message content analysis module 340, the message client location determination module 350, the message classification module 360, and the security policy determination and application module 370 may be arranged at a separate server. Accordingly, the modules arranged at the separate server may perform analysis of an electronic message and transmit a result of the analysis of the electronic message to the email server without informing the email server of the specific criteria or policy used to analyze the electronic message.

The sync request identification module 310 may determine whether a request has been received from a message client to synchronize message. In some embodiments, the message client is a mobile device (e.g., smartphone) that supports mobile email with Microsoft ActiveSync to send and receive emails such that the request is to synchronize its mailbox. The sync request identification module 310 may be arranged at an email server (e.g., Exchange server) to determine whether a request has been received directly from the message client. In other embodiments, the sync request identification module 310 may be arranged at an email proxy (e.g., a Microsoft ActiveSync proxy) to determine whether a query for new messages has been received from the message client (e.g., a mobile device) via a network. Accordingly, when it is determined that the query has been received at the sync request identification module 310 arranged at the email proxy, the sync request identification module 310 may then transmit a request to synchronize to an email server (e.g., a Microsoft Exchange server). Further, upon determination that a request to synchronize has been received from the message client, a query may be sent to the new message identification module 320 to determine whether there is a new message to be transmitted to the message client.

The new message identification module 320 may be arranged at the email sever to determine whether a new message has been received at the email server that has yet to be transmitted to the message client. In some embodiments, the new message identification module 320 may be arranged at an email proxy (e.g., a Microsoft ActiveSync proxy) to intercept an electronic message before it is transmitted to the target message client. The new message identification module 320 may perform the determination of whether a new message has been received in response to the query sent from the sync request identification module 310. In some embodiments, the new message may be from a sender outside of a recipient's network utilizing the simple mail transfer (SMTP) standard or from within the recipient's network and the email server may store the message until it can be transmitted to the message client.

The message analysis module 330 may analyze multiple elements of the new message identified by the new message identification module 320. In some embodiments, the message analysis module 330 may identify the sender of the message and determine whether the sender is within the recipient's organization or external to the recipient's organization. The message analysis module 330 may also determine whether the sender has specified a specific security policy to be applied to the message. Additionally, the message analysis module 330 may identify the recipient of the message and analyze the subject of the message. Further, the message analysis module 330 may analyze additional fields within a header of the new message to identify further information about the message. For example, the message analysis module 330 may analyze the multiple elements of the new message to determine whether any satisfy a preset condition such as including a keyword (e.g., confidential) or being addressed from a sender that communicates sensitive information.

The message content analysis module 340 may analyze different content elements of the new message identified by the message identification module 330. In some embodiments, the message content analysis module 340 may determine whether the new message includes an attachment. In particular, the message content analysis module 340 may determine whether the new message contains an attachment of a specific format (e.g., a Microsoft Excel file, a Microsoft Word file, or a pdf). In other embodiments, the message content analysis module 340 may also analyze the body of the new message to determine whether the message contains one of a plurality of predetermined keywords. For example, an administrator or user may set a list of sensitive keywords (e.g., budget, private, sensitive, and confidential) and the message content analysis module 340 may analyze the body of the message to determine whether the message includes one of the keywords. Further, the message content analysis module 340 may analyze the content of an attachment to determine whether it includes one of the keywords.

The message client location determination module 350 may determine a location of the message client (e.g. mobile device) from which the request to synchronize has been received from. In some embodiments, the message client location determination module 350 may determine the location of the message client based on information which specifies the location of the message client transmitted by the message client within the request to synchronize. For example, the message client may include a global positioning system (GPS) component that may determine the location of the message client and transmit the determined location within the query. In other embodiments, the message client location determination module 350 may determine that the location of the message client is unidentified.

The message classification module 360 may classify the new message based on the results from the message analysis module 330, the message content analysis module 340, and the message client location determination module 350. In some embodiments, a user may specify a plurality of message classifications each having a different classification criteria. For example, a user may specify multiple low security level classifications, multiple moderate security level classifications, and multiple high security level classifications. The message classes may be based on any one of a variety of factors including for example the recipient's identification, the sender's identification, the location of the recipient, the location of the sender, whether the sender is within the recipient's organization, and the content of the message. Further, the user may vary the message classifications at any time to create new classifications or to modify the existing classifications.

In some embodiments, the message classification module 360 may classify the new message as a first security class having a low level of security when the new message does not include any preset keywords, any attachments, and the message client is determined to be within a trusted network or within the recipient's organization. In other embodiments, the message classification module 360 may classify the new message as a second security class having a moderate level of security when the new message contains an attachment of a predetermined type (e.g., a Microsoft Excel spreadsheet) or a preset keyword. Further, the message classification module 360 may classify the new message as a third security class having a high level of security when the message client is determined to be outside of a trusted network or outside of a trusted geographic region (e.g., country).

The security policy determination and application module 370 may determine an appropriate security policy to apply to the new message based on the classification of the new message by the message classification module 360 and the determination results from the message client location determination module 350. In some embodiments, multiple security policies may be preset by an administrator or user such that each security policy specifies a different level of message distribution security. For example, each security policy may specify how an email message is to be distributed to a user of a mobile device. Further, the administrator or user may specify that the plurality of security policies each correspond to the message classifications and whether the location of the message client is identifiable.

In one embodiment, a first security policy may a low level security. For example, the first security policy may correspond to the first security classification and specify that a message may be transmitted to the message client without modification and in a locally cacheable form. A second security policy corresponding to the second security classification and have a moderate level of security. For example, the second security policy may specify that a message may be delivered as a message containing a body of unmodified cacheable content and an attachment as converted non-cacheable content. In particular, the non-cacheable content (e.g., an attachment) may be converted into HTML format such that when a user of the message client attempts to view the non-cacheable content, the message client retrieves the content from a server, displays the content to the user, and does not cache that specific content.

In another embodiment, a third security policy may have a moderate level of security different from the second security policy. For example, the third security policy may specify that a portion of the body of a message may be transmitted in a locally cacheable form whereas a portion of the message containing a keyword is replaced with non-cacheable content in webmail form. Further, a fourth security policy may correspond to the third message classification and specify that the entire message, body and any attachments, is to be converted to a non-cacheable webmail format before being transmitted to the message client.

The security policy determination and application module 370 may also determine the appropriate security policy to apply not only to a single new message but also to all messages (e.g., email messages) associated with the message client (e.g., mobile device). For example, when the message client location determination module 350 determines that the location of the message client is unidentified, a fifth security policy having a highest level of security may be selected. In particular, the fifth security policy may specify that all of the emails locally cached on the message client are to be replaced with non-cacheable webmail messages and all new messages are to be converted into non-cacheable webmail messages until the location of the message client may be determined.

Additionally, when the message client location determination module 350 determines that the location of the mobile device is located in a trusted home network, a sixth security policy having a lowest level of security may be selected. For example, the sixth security policy may specify that all messages are to be transmitted to the message client without modification and in a locally cacheable form regardless of whether a new message is determined to include an attachment and a keyword. In other embodiments, when the sender has specified a particular security policy, the security policy determination and application module 370 may either apply the security policy specified by the sender or a security policy having a higher level of security based on the analysis of the new message described above.

The security policy determination and application module 370 may then apply the determined security policy. In some embodiments, the security policy determination and application module 370 may allow the new message to be transmitted by the message transmission module 380 without modification when a low level security policy has been determined. In other embodiments, the security policy determination and application module 370 may modify the entire content (e.g., message body and attachments) of the new message into a non-cacheable form when a higher level security policy has been determined. For example, the entire new message content may be replaced with an HTML iFrame and a copy of the new message content may be rendered into the iFrame such that the content of the new message cannot be cached onto the message client (e.g., mobile device).

In further embodiments, the security policy determination and application module 370 may modify only a portion of the new message when a moderate level security policy has been determined. For example, a portion of the new message content may be replaced with an HTML iFrame and a copy of the specified portion of the new message content may be rendered into the iFrame. In other embodiments, the security policy determination and application module 370 may convert an attachment of the message into a non-cacheable format.

Furthermore, the security policy determination and application module 370 may apply an updated security policy to all of the messages within the user's account. For example, when the message client location determination module 350 determines that the client is within a home area (e.g., a trusted local area network), all messages may be transmitted to the client in a cacheable format. However, when the message client location determination module 350 determines that the client has moved to an area outside of the home area (e.g., to a foreign country), the security policy determination and application module 370 may automatically apply a security policy having a higher level of security.

In some embodiments, when the message client location determination module 350 determines that the location of the client is unknown, the security policy determination and application module 370 may automatically apply the security policy having the highest level of security to all message associated with the message client. Further, when the message client location determination module 350 determines that the location of the message client is now within the trusted home network, the security policy may be updated to the lowest level and all messages may be delivered to the message client in a cacheable form.

The message transmission module 380 may transmit the new message to its intended recipient after the security policy determination and application module 370 has applied the appropriate security policy. In some embodiments, the message transmission module 380 may transmit the new message in its original form without modification according to the lowest level security policy. In other embodiments, the message transmission module 380 transmit the message which has been modified such that a portion of the message content is delivered to the message client as an HTML iFrame according to a moderate level security policy. Accordingly, when a user attempts to read the content of the new message transmitted by the message transmission module 380, the message client may then retrieve the content of the message from a server in the HTML format. In additional embodiments, the message transmission module 380 may transmit the new message in which the content has been converted to a webmail format such that no cacheable content is delivered to the message client.

Figure 4:
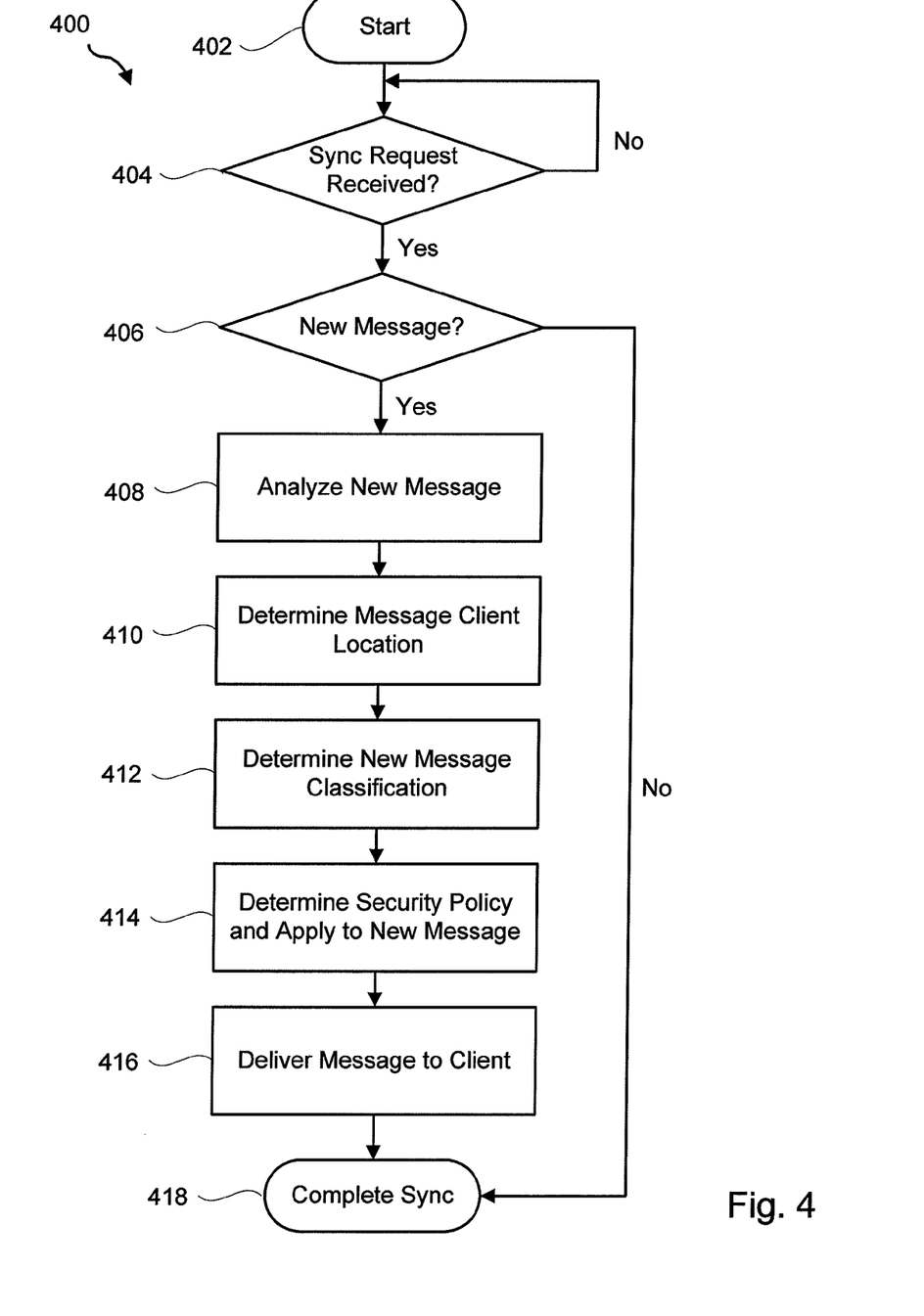
FIG. 4 shows a method for managing electronic message distribution in accordance with an embodiment of the present disclosure.

FIG. 4 shows a method 400 for managing electronic message distribution in accordance with an embodiment of the present disclosure. At block 402, the method 400 may begin.

At block 404, it may be determined whether a synchronization request has been received from a message client. In some embodiments, the determination of whether the synchronization request has been received may be performed the sync request identification module 310 described above. The synchronization request may be a request to synchronize an email message mailbox at the message client (e.g., a mobile device) with a corresponding email message mailbox at an email server (e.g., Microsoft Exchange server). In some embodiments, the message client may be a mobile device that connects to the email server via an ActiveSync proxy. In other embodiments, the client may be a mobile device that directly connects to the email server via a network.

Further, the determination at block 404 may be performed by the sync request identification module 310 arranged at one of an ActiveSync proxy or an email server. If it is determined at block 404 that a synchronization request has been received from the message client, then the process proceeds to block 406. However, if it is determined at block 404 that a synchronization request has not been received from the message client, then the process repeats block 404 until a it is determined that a request has been received.

At block 406, it may be determined whether a new message has been received at the server (e.g., email server) that has yet to be transmitted to the message client. In some embodiments, the determination of block 406 may be performed by the new message identification module 320 discussed above. Further, a new email message specifying an email account associated with the message client (e.g., a mobile device) may be received at the email server and stored until a request to synchronize the message client's email mailbox has been received. If it is determined at block 406 that no new messages are present, the process proceeds to block 416 to complete the synchronization. In some embodiments, information may be transmitted to the message client indicating that no new messages are present. However, if it is determined at block 406 that a new email message is present, the process may proceed to block 408.

At block 408, the new message identified at block 406 may be analyzed. In some embodiments, the new message may be a new email message that is analyzed by the message content analysis module 340. The new message may be analyzed at an ActiveSync proxy, an email server, or a separate third party service (e.g., Data Loss Prevention from Symantec) arranged at a location different from the proxy and email server. For example, a header and a body of the email message may be analyzed. The analysis of the message will be described in detail below with respect to FIG. 5. Upon completion of the analysis of the new message, the process may proceed to block 410.

At block 410, a location of the message client may be determined. In some embodiments, the location of the message client is determined by the client location determination module 350 described above. For example, the location of the message client (e.g., mobile device) may be determined by the message client and reported with the synchronization request (e.g., within a header of the request). In some embodiments, the location of the message client may determined as unidentified. Further, the location of the message client may be determined to be a geographic location based on for example GPS data or an IP address. The geographic location may be a specific latitude and longitude, a location within a specified area, a city, a state, a country, or a continent, or any other user defined area. Additionally, in some embodiments, the location of the message client may be determined to be a network location such as for example, a specific IP address within a home network, a location within a home network, a location within a trusted network, or a location an within a network outside of a trusted or home network.

In other embodiments, the message client may be configured to render messages based on HTML5 and according may request location information. In additional embodiments, a user of the message client may be required to report their location via an HTML interface on the message client. Further, an application or program may be installed on the message client that reports the location of the message client to the message client location determination module 350 outside of the query or via a different channel. Upon completion of determining the location of the message client, the process may proceed to block 412.

At block 412, the new message may be classified according to a plurality of preset message classifications. In some embodiments, the classification of the new message may be performed by the message classification module 360 described above. For example, the new message may be given any one of a low security classification, a moderate security classification, and a high security classification based on the results of blocks 408 and 410.

At block 414, an appropriate security policy may be determined and applied to the new message based on the results of blocks 408-412. In some embodiments, the determination and application of the security policy may be performed by the security policy determination and application module 370 described above. Further, the appropriate security policy may be determined to be any one of a low level security policy, a moderate level security policy, a high level security policy, or any other preset or user defined security policy. In some embodiments, the determined location of the message client from block 410 may be given priority over the results from the analysis of the new message from block 408. For example, if it is determined at block 410 that the location of the message client is unidentified, then a security policy having a high level of security (e.g., convert all message content to webmail HTML format) may be selected and applied regardless of the results of the message analysis from block 408.

In some embodiments, the security policy may be determined to be a low security policy and according, the new message may be transmitted from the server to the message client without modification. In other embodiments, the security policy may be determined to be a moderate security policy and according, a portion of the new message may be converted into a non-cacheable format and then the entire message may be transmitted from the server to the message client. Upon completion of the selection of the appropriate security policy and the application of the selected security policy to the new message, the process may proceed to block 416.

At block 416, the new message having the security policy applied at block 414 is delivered to the message client via a network. In some embodiments, the delivery of the new message may be performed by the message transmission module 380 described above. For example, when the message client is a mobile device, the message (e.g., email message) may be transmitted over a cellular network or any other wireless network to the message client.

Figure 5:
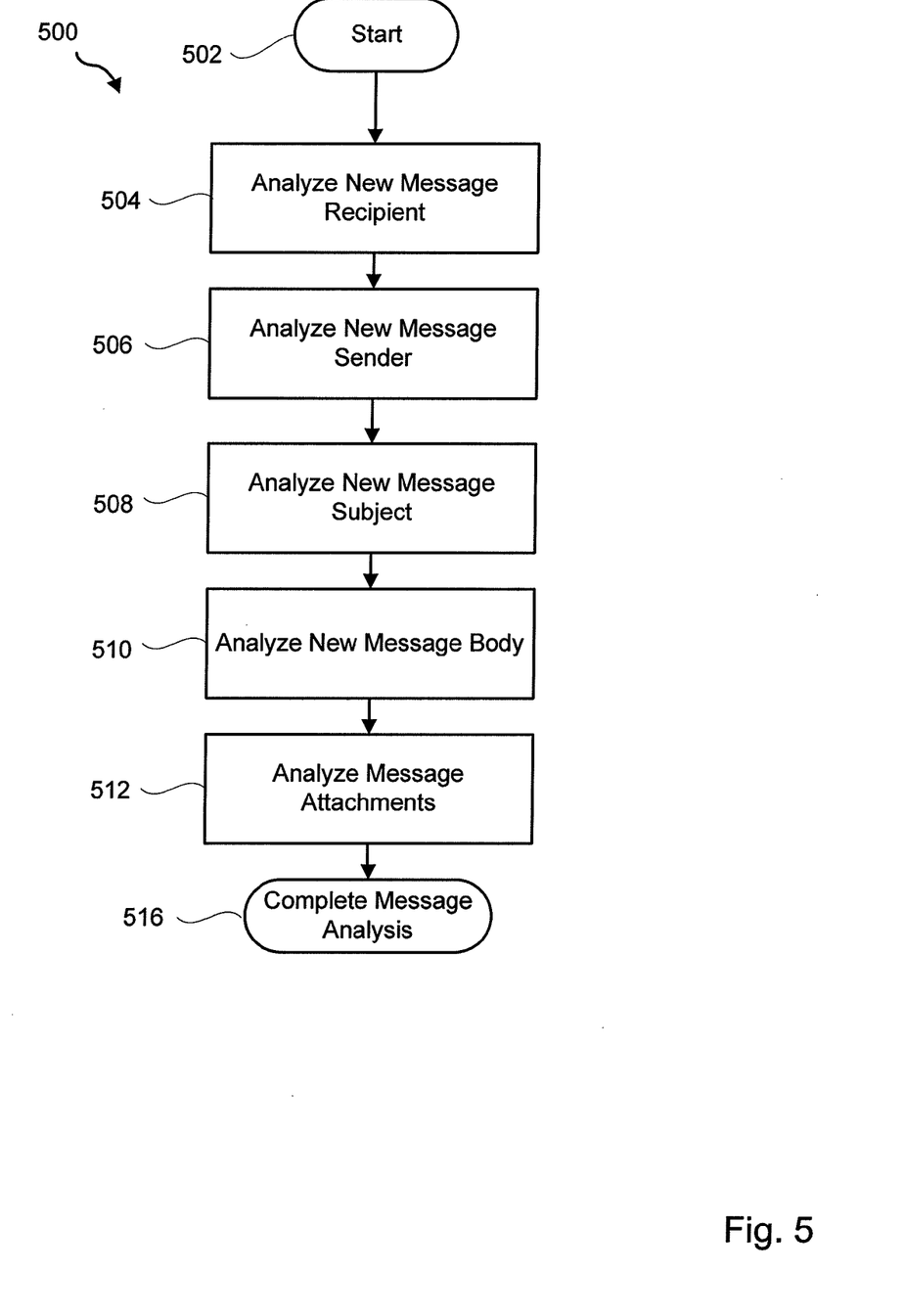
FIG. 5 shows a method for analyzing electronic messages for distribution in accordance with an embodiment of the present disclosure.

FIG. 5 shows a method 500 for analyzing messages for electronic distribution in accordance with an embodiment of the present disclosure. At block 502, the method 500 may begin.

At block 504, the intended recipient included in a header of new message may be analyzed. In some embodiments, the analysis of the message recipient may be performed by the message analysis module 330 described above. For example, the recipient may be identified as a known email address within a home email system (e.g., within an organization) or an unknown email address outside of the home email system (e.g., outside the organization). Upon determination of the intended recipient of the new message, the process may proceed to block 506.

At block 506, the sender included in a header of the new message may be analyzed. In some embodiments, the analysis of the message sender may be performed by the message analysis module 330 described above. For example, the sender may be identified as a known email address within the home email system (e.g., within an organization) or an unknown email address outside of the home email system (e.g., outside the organization). Upon determination of the sender of the new message, the process may proceed to block 508.

At block 508, a subject of the new message may be analyzed. In some embodiments, the analysis of the message subject may be performed by the message analysis module 330 described above. For example, the subject of the new message may analyzed to determine if it includes a preset keyword. Further, at block 508, additional message fields such as a carbon copy ("CC") field, a blind carbon copy ("BCC") field or any other field contained within a message header may be analyzed to determine whether a condition set according to any one of the above-identified message classifications is satisfied. Upon completion of the analysis of the subject of the new message, the process may proceed to block 510.

At block 510, a body of the new message, which may contain any one of plain text, Rich Text Format, and/or HTML, may be analyzed. In some embodiments, the analysis of the body of the new message may be performed by the message content analysis module 340 described above. For example, the entire content of the message body may be analyzed to determine whether the message contains a preset keyword. For instance, the body of the new message may be analyzed to determine whether it includes the word "budget." Upon completion of the analysis of the body of the new message, the process may proceed to block 512.

At block 512, the new message is analyzed to determine whether it includes any attachments and when it is determined to include an attachment, a format of the attachment may be determined. In some embodiments, the analysis of the attachments may be performed by the message content analysis module 340 described above. For example, the new message may be analyzed and it may be determined that the new message includes a Microsoft Excel spreadsheet. Further, the content of the attachment may be analyzed to determine whether it includes any one of a plurality of preset keywords.

At this point it should be noted that electronic message distribution management in accordance with the present disclosure as described above may involve the processing of input data and the generation of output data to some extent. This input data processing and output data generation may be implemented in hardware or software. For example, specific electronic components may be employed in a electronic message management module or similar or related circuitry for implementing the functions associated with managing electronic message distribution in accordance with the present disclosure as described above. Alternatively, one or more processors operating in accordance with instructions may implement the functions associated with electronic message distribution management in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing electronic message distribution, the method comprising:
    analyzing an electronic message;
    determining whether the electronic message satisfies one of a plurality of predetermined conditions;
    determining a geographical location of an intended recipient of the electronic message;
    converting at least a portion of the electronic message from a first predetermined format to a second predetermined format based on the determination of whether the electronic message satisfies the one of the plurality of predetermined conditions and the determined geographical location of the intended recipient of the electronic message, wherein the first predetermined format is a message format locally cacheable by the intended recipient and the second predetermined format is a message format that is not locally cacheable by the intended recipient; and transmitting the converted electronic message.

2. The method according to claim 1, wherein the plurality of predetermined conditions are set by a user.

3. The method according to claim 1, wherein analyzing the electronic message includes determining whether a header of the electronic message satisfies a first predetermined condition, the first predetermined condition including at least one of a first plurality of predetermined keywords, a known recipient, and a known sender.

4. The method according to claim 1, wherein analyzing the electronic message includes determining whether a body of the electronic message satisfies a second predetermined condition.

5. The method according to claim 4, wherein the second predetermined condition includes a second plurality of predetermined keywords.

6. The method according to claim 1, wherein analyzing the electronic message includes determining whether the electronic message includes an attachment.

7. The method according to claim 6, wherein when the electronic message is determined to include the attachment, the attachment is analyzed to determine whether it satisfies a third predetermined condition.

8. The method according to claim 1, wherein the second predetermined format is a non-cacheable webmail format according to the HyperText Markup Language (HTML) standard.

9. The method according to claim 1, further comprising:
intercepting the electronic message;
receiving a request to retrieve electronic messages; and
determining whether the electronic message has yet to be transmitted, in response to the reception of the request,
wherein analyzing the electronic message is performed when it is determined that the electronic message has not yet been transmitted.

10. The method according to claim 1, wherein the electronic message is an email message, the converted electronic message is transmitted from an electronic messaging server to the intended recipient which is a mobile client, and determining whether the electronic message satisfies one of the plurality of predetermined conditions is performed at a server separate from the electronic messaging server.

11. The method according to claim 10, wherein the geographical location of the mobile client includes GPS coordinates of the mobile client identified separately from the electronic message.

12. The method according to claim 11, wherein the geographical location of the mobile client is transmitted from the mobile client to the server.

13. The method according to claim 11, wherein a body of the electronic message is converted from the first predetermined format to the second predetermined format when the geographical location of the mobile client is determined to be unknown.

14. The method according to claim 11, wherein a body of the electronic message is converted from the first predetermined format to the second predetermined format when the geographical location of the mobile client is determined to be outside of a predetermined area.

15. The method according to claim 11, wherein an attachment to the electronic message is converted from the first predetermined format to the second predetermined format based on the determined geographical location of the mobile client.

16. The method according to claim 11, wherein a plurality of electronic messages are converted from the first predetermined format to the second predetermined format based on the determined geographical location of the mobile client.

17. The method according to claim 1, further comprising:
classifying the electronic message based on the analysis of the electronic message and the determination of whether the electronic message satisfies the one of the plurality of predetermined conditions;
determining a security policy based on the classification of the electronic message; and
applying the security policy to the electronic message,
wherein the security policy indicates when electronic message is to be converted from the first predetermined format to the second predetermined format.

18. At least one nontransitory processor readable storage medium storing a computer program of instructions configured to be readable by at least one processor for instructing the at least one processor to execute a computer process for performing the method as recited in claim 1.

19. A system for managing electronic message distribution comprising:
one or more processors communicatively coupled to a network; wherein the one or more processors are configured to:
analyze an electronic message;
determine whether the electronic message satisfies one of a plurality of predetermined conditions;
determine a geographical location of an intended recipient of the electronic message;
convert at least a portion of the electronic message from a first predetermined format to a second predetermined format based on the determination of whether the electronic message satisfies the one of the plurality of predetermined conditions and the determined geographical location of the intended recipient of the electronic message, wherein the first predetermined format is a message format locally cacheable by the intended recipient and the second predetermined format is a message format that is not locally cacheable by the intended recipient; and
transmit the converted electronic message.

* * * * *